United States Patent [19]

Harper et al.

[11] 4,178,716
[45] Dec. 18, 1979

[54] NUTRIENT FILM TECHNIQUE

[75] Inventors: Douglas C. Harper; Derek C. Attenburrow, both of Ipswich, England

[73] Assignee: Fisons Limited, Suffolk, England

[21] Appl. No.: 868,505

[22] Filed: Jan. 11, 1978

[30] Foreign Application Priority Data

Jan. 15, 1977 [GB] United Kingdom ............... 1636/77
Aug. 26, 1977 [GB] United Kingdom ............. 35976/77

[51] Int. Cl.² ........................................... A01G 31/00
[52] U.S. Cl. ....................................... 147/62; 47/59; 47/DIG. 4
[58] Field of Search ....................... 47/59–62, 47/17, 58, 79–82, 39, DIG. 4

[56] References Cited

U.S. PATENT DOCUMENTS

| 2,062,755 | 12/1936 | Lyons et al. | 47/62 |
| 3,578,431 | 5/1971 | Ingestad et al. | 47/62 X |
| 3,892,982 | 7/1975 | Holmes | 47/62 X |
| 4,085,546 | 4/1978 | Hallar | 47/59 |
| 4,118,891 | 10/1978 | Kehl et al. | 47/62 X |

OTHER PUBLICATIONS

The Tank Are Coming, Spessard, Hydrophonics Inc., Conway, Ark., 1948, pp. 95, 106.
NFT Culture, Supplement to the Grower, Feb. 14, 1976, pp. 33, 35, 37–40, 43, 44.

Primary Examiner—Robert E. Bagwill
Attorney, Agent, or Firm—Merriam, Marshall & Bicknell

[57] ABSTRACT

The present invention relates to a method for operating a nutrient film plant growth technique so as to minimise the build up of one chemical in the circulating solution without a corresponding build-up of other chemicals, notably nutrient chemicals, therein. For example the feed of nutrient chemicals is in proportion to the feed of water to the solution, or the concentration of non-nutrients is maintained at a low level or discounted when assessing the amount of nutrient to add to the solution to maintain the desired nutrient level.

13 Claims, 1 Drawing Figure

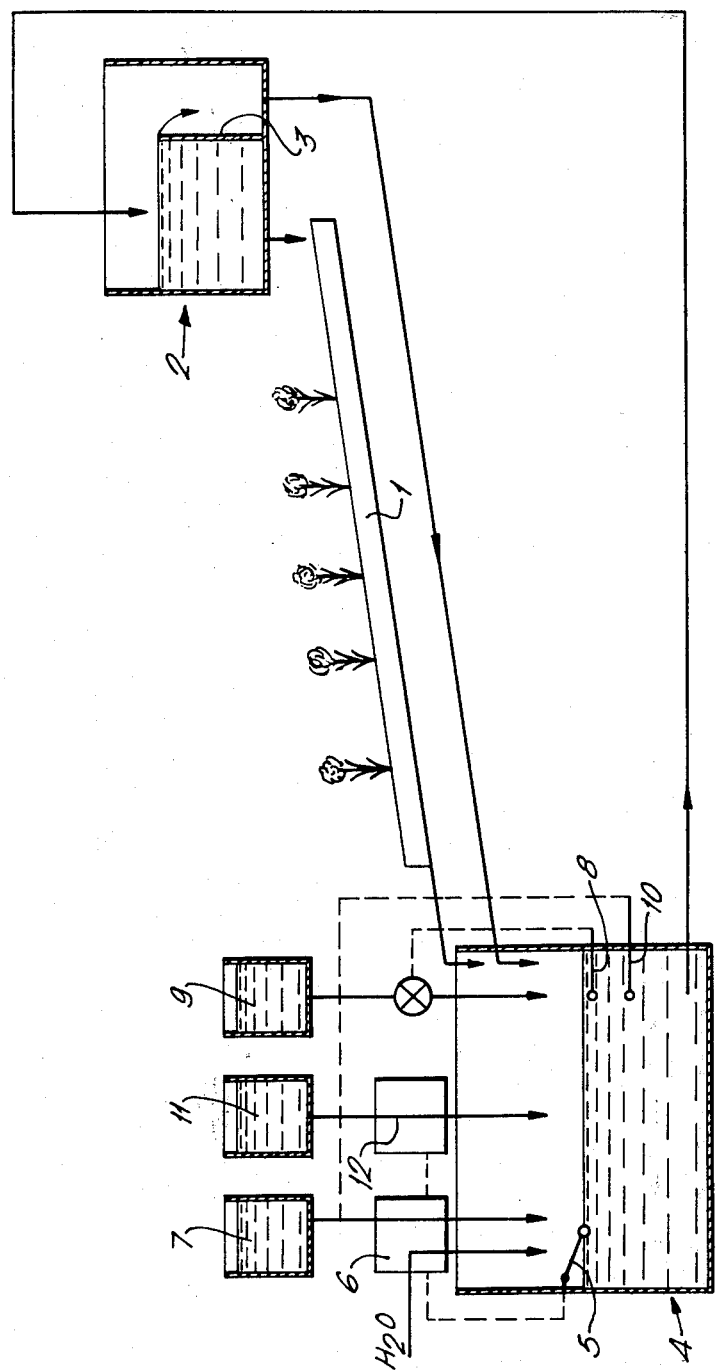

NUTRIENT FILM TECHNIQUE

The present invention relates to a process and composition, notably for use in the growth of plants.

It has been proposed to grow plants with their roots immersed in a flowing film of liquid containing plant nutrients. Typically, a shallow waterproof trough is formed and a film of aqueous plant nutrient flows though the trough, is collected and recycled, e.g. to a header tank from whence it is fed back to the trough. Such a plant growth system is called hereinafter a nutrient film technique or NFT system.

During the cycle, water and nutrients are taken up by the plant and these require replacement before the nutrient solution is recycled. Control of the nutrient addition is achieved by addition of water in response to a level sensor, addition of nutrient in response to a conductivity sensor and addition of acid in response to a pH sensor since the circulating nutrient solution becomes progressively more alkaline. In practice it is difficult to ensure uniform constitution of the circulating nutrient system and temporary major variations in the composition occur. Furthermore, after a period of operation, plants growing in such an NFT system die back even though it appears from the control sensors that the solution contains adequate nutrients. The cause of this die back has not hitherto been identified. In order to rectify the dying back it has become conventional to bleed off part of the nutrient solution to waste rather than recycle it and to make up the lost liquid by adding fresh water. Alternatively, the whole system is drained down, flushed out with fresh water and then fresh nutrient solution is cycled around the system. However, both these operations are wasteful in water and nutrient and cause a check in the plant growth by subjecting the plant to sharp changes in environment.

Whilst the above problems have been realised by those engaged in nutrient film techniques, they have been accepted as inevitable. Attention has been directed toward minimising their effect by improving the monitoring of the nutrient composition.

We have now found that the above problems are caused by the build up of non-nutrient salts or a gross imbalance of the nutrient chemicals in the solution. The conductivity sensor does not distinguish non-nutrient salts from major nutrient salts, nor does it detect an imbalance of the nutrient salts. Where the concentration of the non-nutrient salts is allowed to build up, it reaches such a level that the conductivity sensor no longer activates the feed of nutrient salts to the system causing a check in the plant growth.

We have found that the above problems can be reduced by feeding predetermined proportions of nutrient salts to the system in proportion to the water that is fed to the system. This ensures that, even though the level of non-nutrient salts may be high, main nutrient salts are still added in the desired proportion, and that an imbalance of nutrients is minimised, a least in the short term. Alternatively, the nutrient level monitoring system can be modified so as to discount that portion of the conductivity or other reading which is caused by the non-nutrient salts. A further alternative is to employ nutrient feeds which contain reduced amounts of non-nutrient salts and thus reduce the rate of accumulation of such salts in the NFT system. In these cases the level of non-nutrient salts is discounted or minimised and the nutrient feed is maintained at the desired level, i.e. the build-up of one chemical or ion without a build-up of other nutrient chemicals or ions in the solution is reduced and the desired minimum main desired nutrient levels are maintained.

Accordingly, the present invention provides a method for operating an NFT system characterised in that the feed of chemicals to the system is arranged to minimise the build-up of one of the chemicals without a corresponding build-up of other chemicals, notably of main nutrient chemicals so as to maintain a minimum level of each main nutrient chemical typically more than 10 ppm N, 5 ppm P and 10 ppm K in the circulating solution. Preferably, the system is operated so that the content of plant non-nutrient chemicals in the solution circulating in the system is maintained at a low level, typically less than 100 ppm total plant non-nutrient chemicals, and/or is disregarded when assessing the amount of main plant nutrient chemicals to be added to the system to maintain the desired nutrient levels in the water circulating in the system.

The term main nutrient chemical is used herein to denote plant physiologically acceptable ions or compounds containing nitrogen, phosphorus, potassium, calcium, magnesium or sulphur in which these elements are available to the plant. The term non-nutrient chemical is used herein to denote compounds or ions containing only other elements. This term will herein thus include minor and trace element plant nutrients as well as chemicals which have no beneficial effect on the growth of the plant. The term nutrient when used generally denotes both main nutrient and non-nutrient chemicals. It will be appreciated that water is essential for plant growth and is specifically excluded from the above definition of non-nutrient chemical.

We have surprisingly found that by using the system of proportionated feeding of nutrients it is possible to operate a nutrient film technique for long periods without the effects of an accumulation of non-nutrient chemical becoming apparent. Also since nutrient chemicals in essentially the appropriate proportions for plant growth are fed to the system, any gross imbalance of nutrients is at least partially rectified. It is thus possible to maintain the plants in a more uniform environment than hitherto and to reduce the amount of water and/or nutrient solution wasted. It is necessary to monitor only the volume of nutrient solution and water added. There is no need to measure the nutrient level itself, since the nutrients are automatically replenished as the water level is maintained.

Accordingly, the present invention provides a system for growing plants using a nutrient film technique characterised in that a nutrient solution is circulated, the volume of circulating solution is monitored and is maintained at the desired level by the addition of water, plant nutrients being fed to the circulating solution in proportion to the water fed to the solution. The invention also provides a trough in which plants are adapted to grow and through which plant nutrient solution is adapted to circulate, means for circulating the nutrient solution through the trough and means for feeding nutrients and water to the solution, the nutrient feed means being adapted to feed nutrient solution in proportion to the water fed to the circulating solution.

The proportionation of the feed of nutrient to the water feed may be achieved in a number of ways. Thus, a concentrated nutrient solution is fed to the nutrient solution circulating in the NFT system by a proportionating pump which relates the feed of concentrate to the rate of feed of water. Alternatively, nutrient concentrate may be mixed with part or all of the water to be fed to the NFT system to provide the desired diluted solution. For example, the water fed to the NFT system can pass through a venturi section and draw concentrate into the water at the venturi from a reservoir. Other methods for achieving proportionation of the nutrient feed can be readily devised.

The presence of non-nutrient chemical can also be discounted by monitoring the concentration of the chemicals in the solution circulating in the NFT system in two ways, one for a total reading of the chemicals present and the other to give a selective reading for the concentration of the non-nutrient chemicals. The difference between the readings will give a more accurate reading of the main nutrient level. Whilst one could base the conductivity or other reading solely on the main nutrient chemicals, the number of such chemicals present which would require individual monitoring is comparatively large. It is more practical to base the selective measurements on the comparatively few major non-nutrient chemicals, e.g. halides and sodium, present.

Accordingly, the present invention provides an NFT system provided with means adapted to provide a selective measurement of the concentration of main nutrient as opposed to non-nutrient chemicals in a nutrient solution when circulating in the system. Preferably, this means is characterised in that the concentration is monitored both as an overall total concentration, e.g. by measuring the overall conductivity, and also as a concentration of one or more selected non-nutrient chemicals. The addition of nutrients to the circulating solution is in response to the difference between the two concentrations.

It will be appreciated that conductivity is but one method by which the concentrations of the species in the nutrient solution are determined. Other methods may be used, e.g. colorimetric or turbidimetric analyses. Conductivity measurement will usually be the simplest and easiest method and is carried out in the conventional manner. Thus, for example the overall conductivity may be measured using a conductivity cell in an AC Wheatstone Bridge circuit.

Where the difference between the overall concentration and second concentration reading is derived, the second concentration reading is achieved by a number of methods, e.g. by the use of selective electrodes or by the use of quantitative analytical techniques, e.g. colorimetric analyses. The reading may be obtained for a related group of ionic species, e.g. halogens; but more usually will be obtained for a single species. If desired, several different species may be monitored and the readings totalled together to give a total reading for non-nutrient species. We prefer to monitor the concentration due to sodium and chloride only as these represent the most often encountered non-nutrient ion species in nutrient solutions in the UK.

The readings for the non-nutrient species usually will not be obtained using conductivity readings, and it will usually be necessary to convert all the readings, overall and individual, to a common base for comparison. Whilst the resultant net reading for the main nutrient species may be inflated by the presence of non-nutrients whose concentration has not been measured, the effect of these other species should be minor if the correct non-nutrient species have been selected for measurement as described above.

Whilst the above functions may be carried out manually, it is preferred to automate them so as to provide a continuous or semicontinuous monitoring of the nutrient levels.

The nutrients are added to the solution circulating in the NFT system either directly (in the form of an aqueous solution or concentrate) or indirectly via a mixing tank in which they are dissolved in part or all of the water to be fed to the NFT system. It is preferred to incorporate acid into the nutrient mixture to provide a storage stable solution which is fed directly to the circulating nutrient solution to make up both water and nutrients lost to the plant, or to provide a storage stable concentrate to be added to the circulating nutrient solution in proportion to the water which is added to made up water lost to the plants.

Whilst it will normally be preferred to incorporate sufficient acid into the nutrient solution or concentrate to give a mixture having the desired pH, it may be desired to monitor the pH of the circulating nutrient solution as a safety measure and to add some of the acid separately. The presence of the acid reduces the problems of scale and precipitate formation, notably in hard water areas, caused by phosphates.

The invention thus also provides a plant nutrient mixture suitable for dilution with water to provide a nutrient solution for use in a nutrient film technique, which mixture comprises water soluble nutrients containing N, P and K, the N being substantially all (i.e. more than 95%) in the form of nitrate nitrogen, and at least 0.1, preferably 0.15 to 0.4, gram equivalents of a mineral acid per 100 grams dry weight of all chemicals in the mixture. The gram equivalents for the acid are assessed only for the neutralisation points of the acid having a $pK_A$ less than 7.5. Thus, phosphoric acid is a dibasic acid for present purposes.

The main nutrient chemicals for present use include for example potassium and/or magnesium and/or calcium nitrates; potassium phosphates, e.g. $KH_2PO_4$; potassium hydroxide; and/or potassium and/or magnesium sulphates. It is preferred that the water fed to the system provide the necessary calcium for the plants. Therefore, it is preferred that the mixture be substantially free from calcium salts, e.g. contain less than 1% Ca by weight on the dry weight of the mixture. Desirably the nutrients are substantially free from non-nutrients chemicals, e.g. halogen and sodium; i.e. contain less than 5% of such salts on the total nutrient chemicals by dry weight. It is also preferred that the nutrient chemicals provide N, P and K in the following weight ratios 1–7:1:3–13.

Where the mixture also contains a mineral acid, this is preferably free nitric acid, but other free mineral acids, e.g. phosphoric acid, or mixtures of acids may be used. The amount of acid used is preferably sufficient to provide a pH of less than 2, e.g. from 0.5 to 1, when the mixture is dissolved in water to form a concentrate for storage and transport. Such a concentrate will provide a pH of 1.5 to 4 when the mixture is dissolved in water to the desired concentration for addition to the trough. Typically, this will require the equivalent of at least 15 parts, e.g. 15 to 35 parts, by weight of nitric acid per 100 parts by dry weight of the nutrient mixture.

However, in some cases the presence of all the acid in the nutrient mixture may be undesirable, e.g. when the hardness and/or the pH of the water fed to the NFT system changes frequently. In such cases the presence of the acid in the nutrient mixture or solution may cause excess acidity in the solution in the NFT system if the nutrient concentrations are maintained at the desired levels. We therefore prefer to feed part or all of the acid as a separate feed from the nutrient, but also proportionated to the water feed.

Accordingly, the present invention provides a method for growing plants in a nutrient film system which comprises feeding water to the system in response to a level sensor in the system; feeding to the system nutrients in proportion to the water fed to the system; and feeding a separate supply of acid to the system in proportion to the water fed to the system.

If desired the addition of the acid may be overridden by a pH sensor where, for any reason, the acidity of the solution was already high. If desired, a yet further separate feed of acid, e.g. of nitric acid, can be provided to feed acid in response to a pH sensor to supplement the N,P acid feed in cases where excessively hard water is used.

The nutrients are fed to the system as described earlier, typically as a concentrate prepared by dissolving the necessary solid ingredients in water. The solid mixture is preferably substantially free from calcium, this being provided in a separate aqueous acid. Typically the solid mixture will contain N and K as the major nutrients and the acid will provide the P and part of the N and (where necessary, e.g. in soft water areas) part or all of the Ca.

The acid usually provides the majority of the P as phosphoric acid and desirably some of the N as nitric acid. Typically, the acid is a mixture of nitric and phosphoric acids providing N and P in weight ratios of 1:3 to 1:5, optionally in admixture with calcium nitrate.

The acid solution is fed to the system in proportion to the water fed. However, it may be desirable to cut off the acid feed when the pH drops below about 5. This may be achieved using conventional means.

The relative proportions of nutrient and acid fed to the system may be varied. Thus, we have found that during their initial growth plants consume higher amounts of N and K than later. The pump feeding the nutrient solution can thus provide a variable rate of feed, e.g. be provided with two settings, a high one and a lower one (e.g. delivering half the nutrient) to compensate for this change in demand. In the case of tomatoes especially, the rate of feed of phosphoric acid would remain substantially constant throughout the growth period, since we have found that the consumption of P is approximately the same throughout the life of the plant.

Furthermore, we have surprisingly found that plants do not consume sulphur at the rates used in present NFT systems. Sulphur has hitherto been quoted as a major essential nutrient in NFT solutions and it has been customary to use some of the nutrient salts in the form of sulphates to provide approximately 60 to 100 ppm of S in the nutrient solution circulating in the NFT system. We have found that the S levels in such a nutrient solution build up to levels (e.g. 500 to 750 ppm) where they materially distort the conductivity measurement.

Accordingly, the present invention provides a process for operating a nutrient film system characterised in that the level of S in the circulating solution is maintained at a level of less than 100 ppm by weight of the solution. Preferably the S level is maintained at less than 80 ppm, e.g. 50 to 70 ppm.

The S levels quoted herein are those levels of S measured by reducing the $SO_4$ in a sample of the solution to $H_2S$ and estimating the $H_2S$ level using standard analytical techniques, e.g. by distilling off the $H_2S$ into cadmium acetate solution where it is determined iodometrically.

The low sulphur levels in the circulating solution are maintained by a number of methods. For example, where a make-up solution of nutrients is added to make up losses of water and nutrients during circulation of the circulating solution, the make-up solution contains approximately half of the sulphur hitherto considered necessary. Typically, the sulphur is added in an amount of 5 to 30 ppm S on the weight of the water added. The amount of addition of the sulphur quoted above is thus for the overall amount of S based on the total amount of water added in a given period.

The desired low levels of sulphur are conveniently achieved by using concentrates or dry mixes of nutrient salts which contain less, typically about half, the amount of sulphur hitherto considered essential. The precise composition of the concentrate or dry mix will vary. For example diluents may or may not be present and the relative proportions of N:P:K ingredients may vary depending upon the make-up solution required. However, in general all concentrates and dry mixes will contain iron in one form or another and will be formulated to provide approximately 5-15 ppm of Fe in the overall solution added to the NFT system. The concentrate or dry mix will typically contain sulphur and iron in weight ratios of S:Fe of from 1-6:1. Typically a dry mix will contain less than 3% preferably from 0.4 to 2.0% by weight of S of the dry mix.

The sulphur for present use is generally present as $SO_4$, e.g. sulphates of magnesium and of trace metals, e.g. copper and zinc. However, other forms, e.g. bisulphates, may be used, provided that they are water soluble and are not phytotoxic at the intended concentrations of use.

In addition to the nutrients and acid, the mixture of nutrients for present use may contain other ingredients, e.g. trace metals (notably copper, molybdenum, zinc, manganese, iron or boron), dyes, pesticides (e.g. algicides, fungicides or insecticides), wetting agents or emulsifiers etc. Where an acid is present in the mixture, it is usually not necessary for there to be present a sequestering agent as has often been considered essential with prior art mixtures.

The nutrients are preferably put up in the form of an aqueous concentrate, typically containing from 20 to 40% by weight of nutrients on the total weight of the concentrate. We have found that the hardness of the water has a surprisingly profound effect upon the success of a nutrient film system. Where the hardness of the water is allowed to fluctuate, variations in pH and the solubility of nutrients in the water may occur. It is thus difficult to maintain the optimum environment for plant growth. Also, it is common practice to tailor make a nutrient solution for a given site by way of trial and error adaption of a basic nutrient formulation. Thereafter, at that site, the adapted formulation has been used regardless of the state of the water feed. As a result changes in the water composition, e.g. as when soft rain water is used in place of hard mains water, have not been monitored or compensated for.

We therefore prefer to use water in the NFT system which is treated to ensure that it contains at least 50 ppm e.g. 100 to 400 ppm, $Ca^{++}$ and/or at least 5 ppm, e.g. 5 to 100 ppm, $Mg^{++}$. This may be achieved by the addition of water soluble calcium salts, e.g. calcium nitrate, in the nutrient mixture and/or in the acid fed to the NFT system. However, this may result in an excess of calcium being fed to the system when naturally hard water is used. We therefore prefer to contact the water with particles of calcium and/or magnesium salts which have a low solubility, typically less than 5 gs/liter at 25° C.

Accordingly, the present invention provides a process for operating a nutrient film system characterised in that the water in the system is treated to maintain the $Ca^{++}$ and/or $Mg^{++}$ content in the water fed to or circulating in the system within the ranges at least 50, e.g. 100–400 ppm $Ca^{++}$ and/or at least 5, e.g. 5 to 100 ppm Mg by contacting the water with a solid calcareous and/or magnesic material which material has a solubility of less than 5 g/liter in water at 25° C.

The water may be pretreated before it enters the system or may be treated within the system. Either way, the effect is to ensure that the water in the system has a substantially uniform calcium and/or magnesium content. The treatment may be such that the pH of the water is also controlled.

By conditioning the water to a substantially uniform state one of the major fluctuations in the nutrient system is reduced and it is possible to provide standardised nutrient formulations and operating instructions which are applicable to a wide range of sites.

The water is passed over or through a bed of calcareous and/or magnesic material, e.g. of calcium carbonate, chalk, dolomitic limestone, gypsum (which also provides some or all of the sulphur required in the system), a complex calcium phosphate or of the granulated material sold under the trade name of Akdolit. In this way the water is automatically treated to dissolve some calcium and/or magnesium therein. The amount dissolved will depend upon a number of factors, e.g. the contact time between the water and the material and the solubility of the material. Where excessive material would be dissolved in the water it may be desired to incorporate the water treatment in a secondary flow circuit in which the water becomes saturated with calcium and/or magnesium. The saturated water is then mixed with untreated water to reduce the overall level of calcium and/or magnesium to the desired level. The split flow may also be used where it is desired to pass the water over two different materials, e.g. chalk to provide calcium and gypsum to provide calcium and sulphur.

The treatment of the water may be carried out within the nutrient film system, in which case the material flowing over the calcareous and/or magnesic material is the circulating nutrient solution. For example, the return tank into which the nutrient solution flows from the growth troughs can have a bed of particles of chalk in the bottom thereof. Alternatively, the recycling nutrient solution is passed through a filter bed containing Akdolit particles, optionally in admixture with sand.

The invention will now be exemplified using the system shown in the accompanying drawing which is a diagrammatic flow chart of an NFT system.

A shallow trough 1 is formed, e.g. from polyethylene sheeting, preferably with a slight fall so that nutrient solution flows through the trough. If desired the floor of the trough is ribbed, to subdivide the width of the trough where several rows of plants, e.g. carnations, are to be grown in one trough. Preferably, the floor of the, or each, trough is provided with capillary matting or other similar material to spread the nutrient solution across the trough.

Nutrient solution is provided from a header tank 2 provided with a wier overflow 3 or other means for maintaining a constant head of solution in tank 2. Preferably, the nutrient solution flows from tank 2 to trough 1 under gravity, although it may be pumped if desired.

Trough 1 discharges nutrient solution to a sump tank 4. Sump tank 4 is provided with a liquid level sensing device 5, e.g. a ball cock or a float type contact switch, which actuates a valve or pump means 6. A nutrient solution is provided in a storage tank 7 and feeds valve or pump means 6. Where tank 7 holds a concentrate which requires dilution before use, pump or valve means 6 incorporates a proportioning means whereby the rate of feed of nutrient is related to the flow of diluent water, which may flow to tank 4 via means 6 or separately. Tank 4 is also provided with a pH sensor 8, e.g. a glass/calomel electrode assembly, and a reservoir 9 for acid where it is desired to add acid in addition to the nutrient solution in tank 7. Tank 4 is also provided with a conductivity sensor 10 to monitor the nutrient level; and with a stirrer to ensure mixing of the contents of tank 4. Where it is desired to add calcium separately from the main water, nutrient or acid feeds, calcium nitrate solution may be added from reservoir 11 via a pump or valve means 12 incoporating means for relating the addition of calcium nitrate to the addition of water.

EXAMPLE 1

When operating the above system using a proportionated feed of water and nutrient to the trough, nutrient solution is fed, e.g. by pump 13, to tank 2 from tank 4. Excess solution overflows wier outlet 3 and returns to tank 4. Nutrient solution flows through trough 1 where part is picked up by plants growing in the trough, and then to sump tank 4. Consumption of water and nutrients by the plants causes the level in tank 4 to drop, thus actuating sensor 5. This initiates the feed of replenishment nutrient and water via means 6. The pH sensor and the conductivity sensors were not used to control the addition of water or nutrient.

Such a system was operated for 6 months for the growth of tomatoes in troughs 15 cms wide and 25 meters long. Tomato plants were placed with their roots spread out over capillary matting in the trough at 45 cm spacings. A nutrient solution containing 100 ppm N, 200 ppm K and 50 ppm P was prepared using hard water (70 ppm Ca) and contained 45 ppm of N as free nitric acid. This solution had a pH of about 2 and was fed at approximately 1.5 liters per minute to trough 1. The solution showed no tendency to form precipitates in tank 2 or elsewhere in the system.

The nutrient solution returning from trough 1 to sump tank 4 was analysed for nutrient content and pH at intervals throughout the trial. The nutrient levels remained at all times in the range 90 to 100 ppm N, 125 to 150 ppm K and 140 to 160 ppm P and the pH was at all times in the range 6.0 to 6.5.

The above system operated for the 6 month period with excellent plant and fruit growth without the need to bleed off nutrient solution or to flush out the system due to the deleterious effects of salt build up or imbalance.

By way of comparison, when a conventional nutrient film technique was used, it was necessary to use a pH control system and acid feed; a conductivity sensor and two separate nutrient feed systems (one for the majority of nutrients, the other for the calcitic nutrients); and a water level sensor and feed system. The nutrient solution caused precipitation in the storage tank and elsewhere in the system, notably in sump tank 4. Also, the nutrient levels in the circulating nutrient solution returning from trough 1 to sump tank 4 varied by as much as 30% and the pH varied by as much as 1.5 units about the desired values.

After 8 weeks this comparative system had to be flushed out with fresh water and refilled with nutrient solution to prevent regression of the plants due to salt build up despite the fact that the conductivity sensor was indicating an apparently high level of nutrient salts.

EXAMPLE 2

An initial solution was prepared using a conventional formulation to provide the following nutrient concentrations:

| Element | ppm |
| --- | --- |
| N | 208 |
| P | 62 |
| K | 332 |
| S | 65 |
| Fe | 12 |

This solution was circulated through the above NFT system. The nutrient level was monitored by a conductivity meter which was set to introduce make-up nutrient concentrate whenever the conductivity fell below 2500 units. The water level in the system was maintained independently using level sensor 5.

The make-up concentrate solution contained the following:

| Element | ppm |
| --- | --- |
| N | 98 |
| P | 40 |
| K | 192 |
| S | 33 |
| Fe | 5 |

After a period of time it was noted that the conductivity reading was rising yet the plant growth was being checked. In these circumstances the system would have been drained down and refilled with fresh nutrient solution. However, analysis of the solution showed that the sulphur level had risen to approximately 600 ppm and this was distorting the conductivity reading.

By way of comparison when the make-up concentrate solution is reformulated to contain only 13 ppm S (i.e. an S:Fe weight ratio of 2.6:1 and corresponding to a dry mix containing approximately 0.38% Fe and 1.0% S) the level of S in the circulating solution can be maintained in the range 50 to 80 ppm even after a prolonged period of operation.

EXAMPLE 3

The above NFT system was operated with a separate feed of nutrients from reservoir 7 being fed in proportion to the water fed to tank 4 as in Example 1.

The nutrient mixture for use in this Example contained

| | |
| --- | --- |
| N | 156 |
| P | — |
| K | 400 |
| S | 13.3 |
| Ca | — |
| Mg | 24 | parts together with minor amounts of trace elements (e.g. 5 parts Fe) and impurities (e.g. Na Cl).

A mixture of phosphoric acid and nitric acid was added separately in proportion to the water fed to tank 4. The acid feed contained 11 parts N and 40 parts P. The water used was hard water and no feed of calcium nitrate was used. The nutrient and acid solutions were fed at such a rate as to provide 167 parts N per million of water fed to tank 4.

Tomato seedlings were grown in trough 1 as in Example 1. However, after 6 weeks it was noted that the conductivity of the circulating solution was rising, due to a build up of N and K in the solution. The proportionating means 6 was adjusted to provide half the amount of nutrient solution, the overall rate of feed of N to tank 4 being reduced to a total of 84 parts N per million parts of water. Thereafter the levels of the main nutrients in trough 1 remained substantially constant.

EXAMPLE 4

An NFT system is operated using conductivity sensor 10 to monitor the concentration of nutrient species in the solution circulating through the NFT system. The nutrient mixture fed to the system has the analysis quoted in Example 2. However, the water as fed to the system contains approximately 300 ppm NaCl. Tank 4 is provided with selective electrodes for sodium and chlorine to monitor the concentration of these ions in the solution. The concentration is noted at intervals and converted to a conductivity contribution due to the NaCl. The conductivity sensor 10 is repeatedly adjusted to compensate for this contribution and to maintain a feed of the nutrient mixture. Thus, initially the conductivity contribution of the NaCl is low (approximately 50 $\mu$mho) but rises progressively as the NaCl concentration rises, being approximately 900 $\mu$mho at 500 ppm NaCl after 2 weeks and 2700 $\mu$mho at 1500 ppm NaCl after 10 weeks operation. The conductivity sensor setting is raised from 3000 to 6000 $\mu$mho to compensate for the NaCl contribution. If this were not done the amount of nutrient mixture fed to the system would decrease with resultant check on plant growth.

EXAMPLE 5

An NFT system was operated as described in Example 1 with proportionated feed of nutrient containing a mineral acid. Initially, the water fed to the system was bore hole water containing approximately 70 ppm of Ca. The system operated satisfactorily with the ph of the circulating solution lying in the range 6.0 to 6.4 units. However, after some weeks operation the water supply was switched over to stored rain water which contained less than 5 ppm Ca. This resulted in a rapid drop in pH to a value of 4 units. In order to counteract this the nutrient feed was changed to provide:
N—100 parts
P—40 parts
K—200 parts
Ca—67 parts Mg—30 parts S—40 parts This feed contained no free mineral acid and it was possible after 2 days operation with this feed to raise the pH of the circulating solution to a value of 6.5 units. If the original feed had been maintained the pH of the solution would have been depressed yet further with irreversible damage to the plants.

After a further period, the store of rain water was consumed and the water supply was switched back to the bore hole. This resulted in a rapid rise in pH in the circulating solution to a value of 7.4 units. This caused precipitation of calcium salts (due to the hardness of the water) in the system. It was necessary to revert to the original nutrient/acid feed to bring the system under control again.

Such fluctuations in the nature of the water supply cause checks in the growth of the plant and require constant surveillance by the operator. However, where the half water feed is passed over a bed of limestone chips and/or gypsum, to achieve near saturation of the water with respect to $Ca^{++}$ and this half is mixed with the untreated water feed, a $Ca^{++}$ level of approximately 200 ppm can be maintained in the feed water. The pH of the water remains substantially uniform. It is thus possible to run the system on the original nutrient-/acid feed despite changes in the source of the water.

We claim:

1. In the method of propagating plants wherein the roots of the plants are at least partially immersed in a circulating aqueous solution containing plant nutrient salts which are consumable by the plants, the water and the nutrient salts which are consumed by the plants being replenished by feeding to the circulating solution water and a mixture of nutrient salts having a major proportion of main nutrient salts which are consumable and a minor proportion of non-nutrient salts which are not consumable by said plants, the improvement wherein said mixture of consumable and non-consumable salts is fed to said circulating solution in a proportion such that the concentration of consumable salts in said solution is maintained at a predetermined excess over the concentration of non-consumable salts, whereby the useful life of said solution is increased.

2. The method of claim 1 wherein said excess is maintained by feeding to said circulating solution a mixture of said salts containing less than 5% by weight of non-nutrient salts.

3. The method of claim 1 wherein replenishment water is added to said circulating solution to maintain the volume thereof at a substantially constant level, and wherein said excess is maintained by feeding to said circulating solution said mixture of salts in direct proportion of said replenishment water.

4. A process as claimed in claim 3 wherein the circulating solution contains a total of less than 100 ppm plant non-nutrients.

5. The method of claim 1 wherein said excess is maintained by:
    measuring the total concentration of salts in said circulating solution;
    measuring the concentration of at least one non-nutrient salt in said solution, and
    adjusting the amount of said mixture of salts to maintain a predetermined minimum difference between said concentrations.

6. The method of claim 5 wherein said concentrations are measured by conductivity measurements of the circulating solution.

7. A process as claimed in claim 6 wherein the overall nutrient concentration is monitored by a conductivity sensor and the selected non-nutrients are monitored by selective electrodes.

8. A process as claimed in claim 7 wherein the non-nutrients selected are halogen and sodium.

9. A process in accordance with claim 1 wherein the level of S in the circulating solution is maintained at a level of less than 100 ppm by weight of the solution.

10. A process as claimed in claim 1 wherein the main nutrients provide N, P and K in the weight ratios 1-7:1-:3-13 respectively.

11. A process as claimed in claim 10 wherein at least part of the N and P in the nutrient mixture fed to the circulating solution is provided by a free mineral acid.

12. A process as claimed in claim 11 wherein the feed of part or all of the acid to the circulating solution is controlled separately from the other main nutrients containing the N and K.

13. A process as claimed in claim 11 wherein the acid is used in such amount as would provide a pH of from 2 to 4 in the overall mixture of water, acid and nutrients fed to the circulating solution.

* * * * *